United States Patent [19]

Höfler

[11] Patent Number: 4,519,241

[45] Date of Patent: May 28, 1985

[54] AUTOMATIC GEAR TESTING APPARATUS

[76] Inventor: Willy Höfler, Fridtjof-Nansen-Strasse 35, D-7500 Karlsruhe 41, Fed. Rep. of Germany

[21] Appl. No.: 477,785

[22] Filed: Mar. 22, 1983

[30] Foreign Application Priority Data

Apr. 1, 1982 [DE] Fed. Rep. of Germany ....... 3212078

[51] Int. Cl.³ ........................................... G01M 13/02
[52] U.S. Cl. .................................. 73/162; 33/179.5 R
[58] Field of Search ..................... 73/162; 33/179.5 R, 33/179.5 A, 179.5 D, 179.5 E; 409/61, 221

[56] References Cited

U.S. PATENT DOCUMENTS

| | | | |
|---|---|---|---|
| 2,906,030 | 9/1959 | Hofler | 33/179.5 R |
| 2,938,275 | 5/1960 | Hofler | 33/179.5 R |
| 3,572,207 | 3/1971 | Fleming | 409/221 |
| 3,950,858 | 4/1976 | Donner et al. | 33/179.5 R |
| 4,276,699 | 7/1981 | Sterki et al. | 33/179.5 R |

FOREIGN PATENT DOCUMENTS 2364917 12/1973 Fed. Rep. of Germany .

Primary Examiner—Steven L. Stephan
Assistant Examiner—Patrick R. Scanlon
Attorney, Agent, or Firm—Edwin E. Greigg

[57] ABSTRACT

An automatic testing apparatus is described for testing the circumferential spacing of gears, for testing deviations in tooth thickness and tooth gaps as well as deviations in gear concentricity, in which with a single revolution of the gear the spacing testing is effected for both the right and the left flanks of the wheel and the values for the gear concentricity deviations, tooth thickness deviations, and tooth gap deviations are preferably ascertained simultaneously, so that a separate measurement apparatus is not required for that purpose.

15 Claims, 14 Drawing Figures

AUTOMATIC GEAR TESTING APPARATUS

BACKGROUND OF THE INVENTION

The invention relates to an automatic testing apparatus for testing the circumferential spacing of gears, in which for the testing operation, the gear is rotationally driven by its own power source, via a slip coupling as needed, in one rotational direction and can be indexed from one measuring position to another, and in which a primary slide for the individual testing operations is displaceable on the frame of the apparatus by a drive mechanism substantially radially toward the gear and back away from it between stops which may be adjustable; provision is made for positioning the gear for the measuring operation and for measuring the spacing deviation of one tooth edge or flank (right or left) approachable in the vicinity of the pitch circle by means of a feeler disposed on the primary slide. Also, provision is made for the automatic insertion, continuing from one tooth gap to another, of the feeler into the measuring position and for retracting the feeler back out of this position, as well as for controlling the pick-up, emission and processing of the thereby coordinated measurement value. Furthermore, the invention relates to a method for testing the circular spacing, and, in a further development, to a method for measuring deviation and gear concentricity, tooth thickness deviation and tooth gap deviation on gears which can be indexed from one measuring position to another.

The testing apparatuses addressed above have varying designs and modes of operation in terms of the details thereof. In one case, the gear is rotationally connected with an incremental rotational drive means, by means of which the gear can be further divided in increments from one tooth gap to another by the spacing dimension ascertained without error, that is, by computer, which is the desired spacing dimension for the ideal case. A measuring feeler, preferably cooperating with an inductive transducer is pivotably supported on the primary slide and is retracted from the gear with the aid of the primary slide between the individual spacing steps brought about by the inductive transducer and, after the spacing step has been performed, is reinserted into the gear. For one testing revolution, the measuring feeler is in contact with one tooth flank, for example the left one, in the vicinity of the pitch circle for each measuring operation, and the deviation of this tooth flank from a zero-balance of the measuring feeler effective during a first measuring operation is ascertained and after processing is expressed by way of example by the electronic portion of the measuring apparatus. Once such a testing revolution has ended, the measuring feeler is shifted to the other tooth flank, that is, in this case, to the right tooth flank of the gear and again balanced to zero, the testing operation takes the same course as described above for one entire gear circumference.

In another measuring apparatus, the gear is driven via a slip coupling in one rotational direction, and two feelers are disposed on the primary slide, for example, one fixed feeler and one pivotable feeler cooperating with an inductive transducer. In the status where they are inserted into the gear, the feelers come into contact with the same tooth flanks (right or left) in adjacent tooth gaps, the flank at which the contact takes place being dependent on the rotational direction of the gear. Now in a first measuring operation the feelers are adjusted to the same circle in the vicinity of the pitch circle of the gear, which as a rule is effected by making them just touch, and the pivotable measuring feeler is then balanced to zero. Then with the aid of the primary slide, the feelers are retracted from the gear and the gear rotates under the effect of a drive mechanism until the feelers, being shifted by one tooth gap or space, are reinserted into the gear. Here the fixed feeler then holds the gear firmly counter to the action of the slip coupling, and the pick-up of the measurement value is effected by means of the pivotable feeler, being accordingly accomplished for the next spacing. Once the gear wheel has been tested in this manner over one revolution on one edge of the teeth, the feelers are then shifted to the other tooth flank, and the rotational direction of the gear is also reversed. The adjustment of the feelers and the course of the testing are then the same as described above.

In a third apparatus, the test object, again rotationally driven via a slip coupling, is firmly held by a detent device for the individual measuring operations, the detent device conventionally being a ball head which is inserted into one tooth gap until it is in contact without play. On the other side of the primary slide, a transverse slide is disposed which can be displaced at a tangent to the gear counter to spring force. One fixed and one pivotable feeler, the latter cooperating with an inductive transducer, are again seated on the slide, in this case the transverse slide. Again in a first measuring operation, and with the gear held in place by means of the detent device, the two feelers are adjusted to the same circle in the vicinity of the pitch circle of the gear against one flank of the teeth, and the pivotable measuring feeler is again balanced to zero. The transverse slide in this case is shifted somewhat counter to the spring force acting upon it. For the next measuring operation, the detent device and the feelers are now retracted from the gear, and the gear rotates further by the amount of one spacing, driven by its drive mechanism, until the detent device dips into the next tooth gap and thus firmly holds the gear counter to the action of the slip coupling. The feelers are then driven into the gear teeth, and the spacing deviation is picked up via the pivotable measuring feeler and further processed in the measuring apparatus until it is transmitted. One complete testing revolution has ended, the feelers are newly adjusted against the opposite tooth flanks of two adjacent tooth gaps and balanced to zero, and the testing of the spacing deviation takes place during a new revolution of the gear.

Further details of these known apparatuses for testing spacing of gears will be explained later in detail in reference to the prior art drawings.

The known testing apparatuses have the disadvantage that two complete gear revolutions are required in order to ascertain errors in circumferential spacing, and furthermore the measuring feelers must be readjusted between the two revolutions from one tooth flank to the other tooth flank. This means high cost in terms of both time and money.

In order to measure deviation in gear concentricity, tooth thickness and tooth gaps, which are also of interest in assessing gear quality, a different testing apparatus is required. With it, in order to measure deviation in tooth gaps and gear concentricity, a ball-like measuring feeler is inserted into each tooth gap of the test object and the depth to which it is inserted at a given time is measured, providing information as to deviation from one tooth gap to another and finally as to the deviation in concentricity.

With respect to the deviations in tooth thickness, a fork-like measuring feeler is placed on each tooth of the gear wheel one after the other, and here again the depth of insertion or the deviation of the depth of insertion from an initially established zero balance is ascertained. Thus, in order to measure the three last-named values, at least further revolution of the gear and one further testing apparatus are required, still further increasing costs in time and money for testing gears beyond what was described above.

OBJECT AND SUMMARY OF THE INVENTION

It is the object of the present invention to modify and improve the apparatus for testing circumferential spacing as well as the associated method in such a manner that with a single gear revolution, the circumferential spacing testing is effected for both the right and left flanks of the wheel, so that the testing time can be reduced to half what was previously known. In a further embodiment of the invention, a method is disclosed which makes it possible, with the circumferential spacing testing apparatus according to the invention, simultaneously to measure deviations in concentricity, tooth thickness, and tooth gap as well, so that a second apparatus for that purpose can be eliminated. It is also possible that the three last-named values—concentricity, thickness and gap—can be ascertained simultaneously with the testing of spacing, so that one further revolution of the gear wheel can also be eliminated.

With respect to the tooth gap or gaps approached for the purpose of testing the spacing at one measuring position in accordance with the invention, the means for measurement value pick-up are shiftable from one tooth flank (right or left) to the other tooth flank before the gear is indexed further to the next measuring position, and the spacing deviations of right and left tooth flanks thus ascertained in one measuring cycle are capable of being transmitted and further processed separately from one another. Thus, according to the invention it is possible to measure the spacing deviations of both the left and right tooth flanks in one gear revolution, and to transmit them either numerically or graphically via an intermediate memory. Towards this end, the zero-balance is again effected at the beginning of the the testing operation, but in this case for both the right and the left edges of one tooth gap, and then the retraction and insertion of the feeler or feelers from one tooth gap to another, as well as their raising from the tooth flanks as needed after the testing operation and then their replacement against the tooth flanks for the next testing operation (in order to reduce wear) again takes place in one gear revolution in a rotational direction which remains the same. Thus the testing time is reduced by half, and substantial costs are eliminated, because the operator is now capable of simultaneously operating a second or further testing apparatus.

As a point of departure consider, for example, a testing apparatus in which the position of the gear for the measuring operations is effected by means of a detent device which is periodically insertable into sequential tooth gaps of the gear while one flexibly supported measuring feeler and a further pivotably supported measuring feeler are both disposed on a transverse slide displaceable substantially at a tangent to the gear wheel on the primary slide, wherein these measuring feelers are capable of being positioned on the same circle in the vicinity of the pitch circle of the gear and brought into contact for measurement purposes on identical (right or left) flanks of adjoining teeth of the gear. The means for attaining the object of the invention in this testing apparatus can be realized in that in one measuring position of the gear the transverse slide is displaceable on the primary slide by switching means in such a manner that the feelers sequentially detect the spacing deviation in terms of both the right and the left flanks of the tooth gaps approached by them, these being adjacent tooth gaps. Thus in each measurement positioning effected by the detent means the feeler pair is shifted from one tooth gap side to the other tooth gap side, and on each side the ascertainment of the spacing deviation is effected before the feeler pair is again retracted by the primary slide from the teeth and the detent means releases the gear so that it can rotate further, jumping ahead by one spacing, until the next detent position is secured.

If the point of departure is a testing apparatus in which the positioning of the gear wheel for the measuring operations is effected by means of a detent device periodically insertable into sequential toothgaps of the gear while one measuring feeler is pivotably supported on a transverse slide displaceable substantially at a tangent to the gear wheel, this measuring feeler being capable of being brought under spring force into contact with the tooth flank to be tested and preferably cooperating with an inductive transducer, then the object according to the invention is advantageously realized by a second pivotably supported measuring feeler also cooperating with an inductive transducer and disposed on the transverse slide and intended for the same tooth flank of the adjacent tooth gap. The measuring feelers are positioned on the same circle in the vicinity of the pitch circle of the gear, and the transverse slide is indexed back and forth at least by the dimension of one tooth gap between stops by means of drive means disposed between the primary and transverse slides. In this case, both pivotable feelers are balanced to zero in a first measuring position, both in terms of the left and the right tooth flanks, with the transverse slide indexed back and forth appropriately.

For the later measuring operations, with a gear indexed further from one tooth gap to another, a differential value formation of the two measurement values picked up from the pivotable feelers then takes place to determine the spacing deviation of the right and the left tooth flanks with the aid of the electric or electronic evaluation portion of the measurement apparatus. In a known manner, the differentiation is such that an excess on the part of the tooth gap just scanned represents a positive value and a deficiency is represented as a negative value.

If instead the point of departure is one of the other types of testing apparatus also discussed above in which the positioning of the gear for the measurement operations is effected by an incremental rotational drive means disposed coaxially with the gear, while a pivotably supported measuring feeler is disposed on the primary slide, then the object of the invention is attained in that in one measuring position of the gear the measuring feeler can be shifted by switching means from one side of the tooth gap approached by it by means of the primary slide to the other side. Thus the gear is positioned to one tooth gap with respect to the measuring feeler for a first measuring operation, and the measuring feeler is inserted into the tooth gap, and in the vicinity of the pitch circle the feeler is brought into contact first with the left tooth flank and then on the right tooth flank adjoining the gap, and each time balanced to zero.

The measuring feeler is then retracted from the teeth with the aid of the primary slide, and the gear is indexed further by means of the rotational drive means, this being accomplished in a controlled manner by the amount of precisely one tooth gap. For the measuring operation which then follows, the measuring feeler is again brought into contact sequentially with the left and then the right tooth flank, and the differential values from the zero balance previously effected are processed with the aid of the measuring apparatus to produce spacing deviations resulting therefrom. The measurement values resulting at this tooth gap can also be stored in memory, so that with the values resulting from the tooth flanks of the next subsequent gaps they can be compared or processed in a differentiation circuit of the type described above.

If the circular spacing testing apparatus is embodied according to a different design such that the positioning of the gear wheel for the measurement operations is effected by means of an incremental rotational drive means disposed coaxially with the gear wheel and has an incremental standard of measurement and a scanning head, while on the primary slide there is a pivotably supported measuring feeler which can be brought under spring force into contact with the tooth flank to be tested and that preferably cooperates with an inductive transducer, then it may be provided according to the invention that the rotational drive means is equipped with a second scanning head, that the effective distance between the scanning heads corresponds to the setpoint dimension of the tooth gap in the vicinity of the pitch circle, and that in one measuring operation, or in the associated position of the measuring feeler, the gear is rotatable from the operating position of one scanning head to the operating position of the other scanning head. This apparatus differs from what has been described above in that it is not the pivotable measuring feeler which is shifted from one tooth flank of the gap being approached to the other tooth flank, but instead the gear is pivoted, with the aid of the tooth scanning heads of the rotational drive means, from one flank position to the other flank position.

Again, with a differently embodied design of the circumferential spacing testing apparatus, if for positioning the gear a fixed feeler is disposed on the primary slide in a position in which it comes into contact in the vicinity of the pitch circle with the (right or left) tooth flank to be tested for the purpose of the measuring operation, then the apparatus according to the invention may also be such that an incremental rotational drive means is coaxially rotationally connected with the gear wheel. The gear in one measuring operation, with a feeler inserted into one tooth gap, is rotable from the contact of this feeler with one tooth flank to the contact with the other tooth flank and that in the two measuring positions thus provided the angular values corresponding thereto can be transmitted as measurement values by the rotational drive means for further processing. This apparatus according to the invention thus makes use of the scanner head of the incremental rotational drive means as a measurement value transducer, while the feeler disposed in a fixed manner on the primary slide serves to position the gear wheel, which is reversible in its direction of rotation, counter to the action of the slip coupling mentioned at the outset above.

If in still another testing apparatus the positioning of the gear wheel for the individual measuring operations or the control for the insertion of the feeler continuing automatically from tooth gap to tooth gap into the measuring position and retraction therefrom, and for controlling the pick-up, transmission and further processing of measurement values coordinated therewith is provided by means of an incremental rotational drive means rotationally connected with and coaxial with the gear wheel, then in accordance with the invention the object can be attained in that two measuring feelers, preferably cooperating with an inductive transducer, are pivotally supported on the primary slide, and that in one measuring operation the right and left flanks of one tooth gap are testable by means of the measuring feelers. This apparatus according to the invention is thus suitable both for the case in which the gear is held in place for the individual testing operation and for the case where the gear revolves without interruption and the "positioning" of the gear is effected by means of the incremental rotational drive means in such a manner that this rotational drive means, in a predetermined measuring position which recurs from one tooth gap to the next, effects the pickup and transmission of the measurement values of the two measuring feelers. Here again, of course, a zero balance of the two measurement feelers is required during a first measurement operation, so that the measurement values of the subsequent tooth gaps can be compared with this zero balance; again, the values picked up from the two measurement feelers can be stored in memory separately from one another in the measuring apparatus, so that the spacing deviations of the right and left tooth flanks can be ascertained by means of the measurement values of the next subsequent measurement operation.

Finally, in a testing apparatus in which the positioning of the gear is attained by means of a feeler disposed in a fixed manner on the primary slide, the primary slide also carrying a pivotable measuring feeler, and the feelers for the measurement process are positioned against one tooth flank contact on a common circle in the vicinity of the pitch circle of the gear, the invention in such case can be realized in that the feelers for the the measurement operation are positioned against the right and left tooth flank of one tooth gap and that an incremental rotational drive means is rotationally connected and coaxial with the gear, and the pickup of a measurement value for one tooth flank is effected by means of the measuring feeler resting thereupon, while for the other flank the measurement value is picked up by means of the scanning head of the rotational drive means. In this case, the gear is thus arrested by the fixed feeler disposed on the primary slide counter to the action of the slip coupling; this position is tested in comparison with an original zero balance by means of the scanning head of the rotational drive means with respect to its deviations, while the deviations of the tooth flank located opposite the fixed feeler are ascertained by means of the pivotable measuring feeler.

It is common to all the possible embodiments of attaining the object of the invention described above with the aid of various testing apparatuses that the spacing deviations are ascertainable for both the right and the left flanks in one gear revolution and can be transmitted as needed following a processing accomplished with computer support. The testing time is thereby reduced at least as much as by half the previous testing time taken by prior art devices, because not only is the second revolution of the gear wheel no longer required but also the shifting of the feelers from one flank to the other tooth flank is unnecessary, and thus the testing apparatus can bed used in two ways.

In accordance with what has been described above, the method according to the invention for testing the circumferential spacing of gears is intended particularly for the use of a testing apparatus of one of the various types described above and is characterized in accordance with the invention such that during each measuring operation the spacing deviation of both the right and left tooth flank or flanks of the tooth gap or gaps used for the measuring operation are ascertained.

In accordance with this method both spacing deviations can be ascertained simultaneously; however, the spacing deviations may also be ascertained sequentially in one measuring operation by shifting the measuring means from one side of to tooth gap to the other side of the tooth gap.

In a further embodiment of the subject of the invention, in a method for measuring deviations in gear concentricity, tooth thickness and tooth gap, the object of the invention is attained in accordance with the invention in that the spacing deviation is ascertained on each side of the tooth gap, or the tooth in the vicinity of the pitch circle, and that with the aid of a computer, the deviations of the two measurement values associated with that tooth gap, or that tooth in the circumferential direction of the gears, are added, then divided by the tangent of the angle of engagement and finally are divided into before the transmission of the measurement value is effected, and a measurement value deviation resulting from an excessive size of the tooth gap, or of the tooth, is processed further as a positive value in determining the deviation in tooth gap, concentricity, and tooth thickness.

By means of this method according to the invention, it is no longer necessary to process the gear with a separate apparatus to accomplish the three last-named testing operations. Instead, these operations can be accomplished by using a testing apparatus of the type described above, and the values furnished by the measurement value transducers are merely processed further in a correspondingly different manner; the two measurement values relating to a common tooth gap are used for testing tooth gap deviations as well as the deviation in gear concentricity, while the same is accomplished with two measurement values between them encompassing one tooth. In accordance with what has been described above, and taking into consideration the given characteristics of gear measurement technique, it is noted that in excessive size on the part of either the tooth gap or the tooth thickness will appear as a positive value.

Finally, in this method it is advantageous that the measurement values resulting from the spacing testing are simultaneously used in a parallel manner with a correspondingly different accumulation of the values furnished by the the measurement value transducers for ascertaining the deviations in gear concentricity, tooth thickness, and tooth gaps. According to this process, the three last-named variables are thus performed simultaneously with the spacing testing, and one and the same measurement values are delivered to various evaluation devices. This mode of operation has the advantage that all the above testing and measurement operations can now be ascertained in one revolution of the gear wheel, so that the processing time to accomplish all these testing and measuring operations is reduced to one-third of what was previously known.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
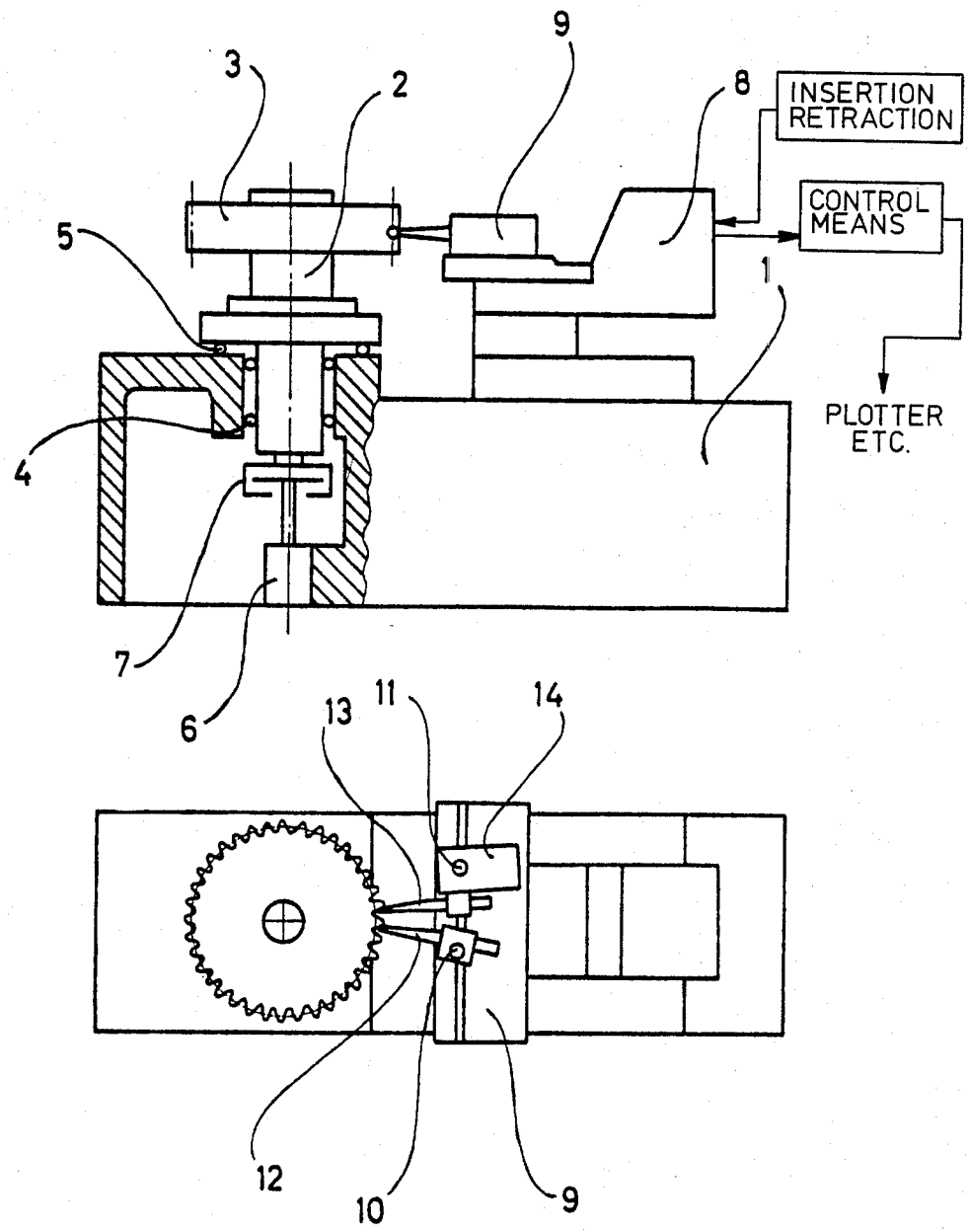
FIG. 1 shows a known testing apparatus for spacing testing, in a simplified illustration seen from the side, partially cut away, and in plan view.

According to FIG. 1, showing a so-called gear measuring machine, a gear wheel 3 is rotatably supported on an apparatus frame 1 of the machine via a shaft 2 supported vertically rotatably therein. The shaft 2 is rotatable with respect to the apparatus frame 1 via radial bearings 4 and axial bearing 5. The drive of the shaft and thus the rotation of the gear 3 are effected via a motor 6 shown in simplified form and a slip coupling 7 incorporated between the motor 6 and the shaft 2.

The machine frame 1 furthermore carries a measuring device generally identified as 8, which contains the necessary electrical and electronic means for measurement value processing and transmission and on which a main or primary slide 9 is displaceable substantially radially to the gear wheel 3. The main slide 9 carries a fixed feeler 12 and a suitably supported feeler 13 in a manner which is adjustable via fastening means 10 and 11. In a manner not shown because it is well known, the pivotably supported feeler 13 cooperates with an inductive measurement value transducer which is disposed in its bearing housing 14.

Figure 2:
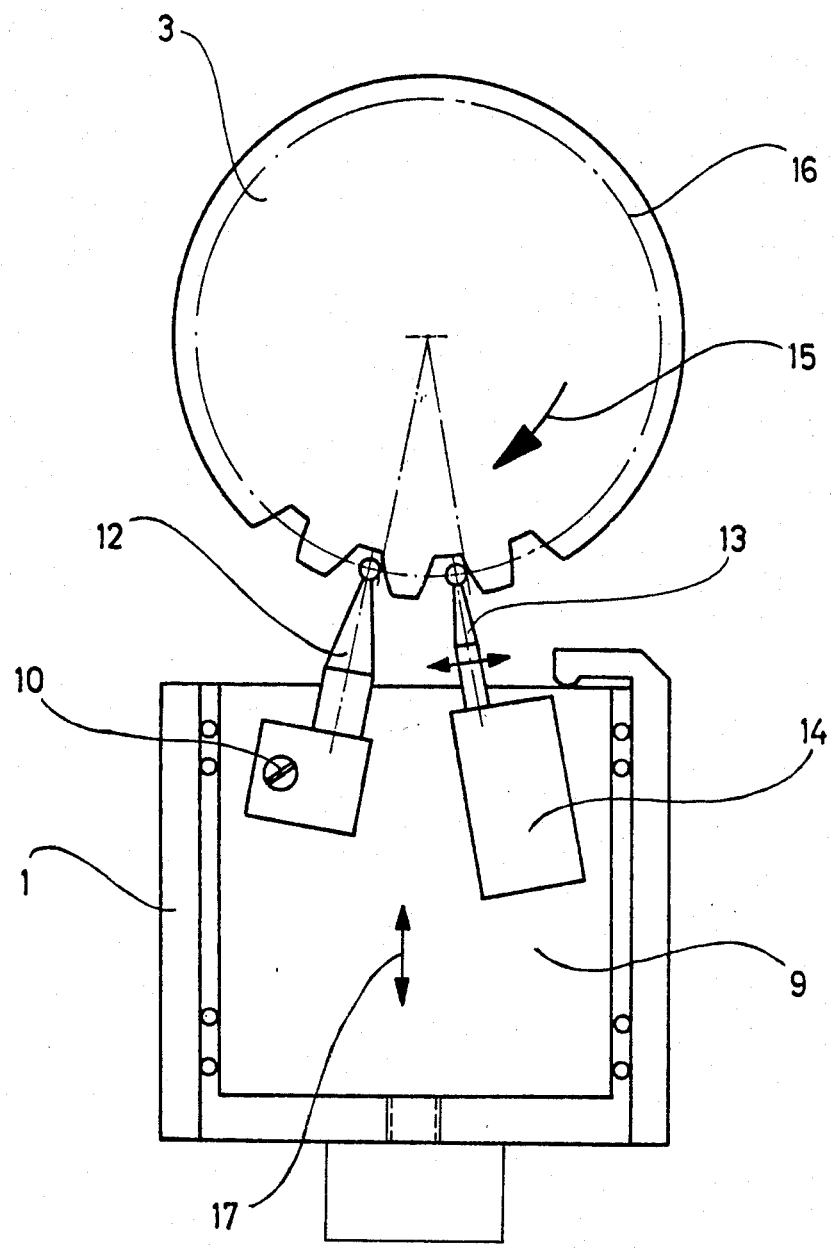
FIG. 2 is an enlarged illustration in plan view showing the mode of operation of the testing apparatus according to FIG. 1.

The mode of operation of this known testing apparatus will be described in further detail referring to FIG. 2, where the parts of the apparatus already mentioned are identified by the same reference numerals.

The gear 3 can be driven rotationally continuously in the direction of the arrow 15 via the slip coupling 7. The main slide 9 carrying the feelers 12 and 13 is now inserted into the gear teeth, after which the gear 3 is arrested in the position shown by the fixed feeler 12. In this position, the measuring feeler 12 is located in the next subsequent tooth gap, simultaneously in contact with the next, identical (left or right) flank; the precondition is that both feelers 12, 13 are adjusted to the same circle in the vicinity of the pitch circle 16 of the gear 3, which as a rule is accomplished at the outset by making the feelers just touch it.

In a first testing operation of this kind, the feeler 13 is balanced to zero with respect to the measurement value furnished by it, whereupon a predetermined measurement is established for the spacing of the gear 3 between the feelers 12 and 13.

The feeler 12, 13 is now retracted from the teeth with the aid of the main slide 9 in the direction of the arrow 17, so that the gear 3 rotates further in the direction of the arrow 15 in response to the drive 6 via slip coupling 7. The control of the main slide 9 is arranged such that the feelers 12, 13 are reinserted into the teeth whenever the next tooth gap appears. Then the gear is again arrested by the feeler 12, and the measurement value of 13 is again transmitted and further processed, in the course of which substantially a comparison with the previously effected zero balance is performed. In this manner, the entire gear 3 is tested in sequence with respect to one flank side to determine spacing deviations, these spacing deviations then being expressed, written or otherwise recorded control for the retraction and insertion of the feelers is well known, reference being made to my U.S. Pat. No. 2,906,030, particularly FIG. 13 therein.

To test spacing deviations of the opposite flanks, the measuring feelers 12, 13 are shifted over to the other side of the tooth gap, and the rotational direction 15 of the gear is also reversed. Then the testing operation takes the same course as described above.

Figure 3:
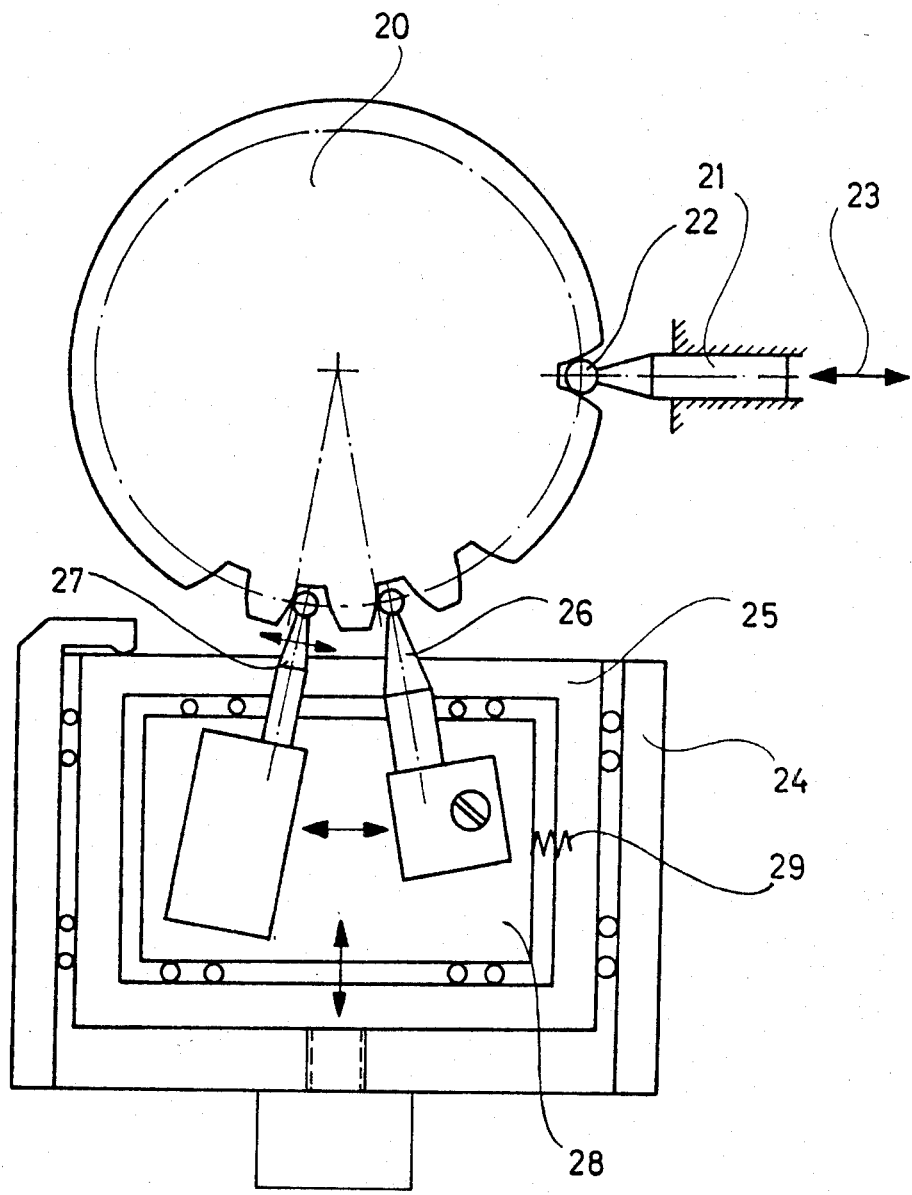
FIG. 3 is a simplified illustration in plan view showing the mode of operation of another known testing apparatus, similar to FIGS. 1 and 2.

FIG. 3 shows another known structure for a testing apparatus in which the gear 20, which is gear-driven continuously via a slip coupling, is arrested by stop means 21 for each measuring operation; in the present case, the stop means 21 are substantially embodied by a detent ball 22, which in the direction of the arrow 23 is inserted from one space to another into the teeth and then retracted from these spaces once again; in the inserted state, the detent ball 22 is seated without play in a given tooth gap.

In the step-wise arresting of the gear wheel 20, feelers 26 and 27 are simultaneously inserted into the teeth via the main slide 25 which is displaceable in the machine frame 24; the feeler 26 is a fixed feeler and the feeler 27 is again a pivotable feeler which cooperates with an inductive transducer, not shown. Both feelers are seated on a transverse slide 28 which is displaceable at a tangent to the gear wheel 20 on the main slide 25, its displaceability being accomplished counter to the force of a spring 29.

If the gear wheel has been arrested by the detent means 21, 22 and the feelers 26 and 27 have been inserted into the teeth, then the transverse slide 28 is brought by the fixed feeler 26 into a predetermined position counter to the force of the spring 29, in which position the measurement value deviations can then be scanned by means of the pivotable measuring feeler 27, these deviations resulting in comparison with a zero balance which has been effected previously in the manner described above.

Following one revolution of the gear wheel, in which one flank side of the tooth gaps (the left or the right side) has been tested with respect to spacing deviations, the feelers 26 and 27 are shifted onto the other tooth flank of the adjacent tooth gaps and are again balanced in that position, this step being followed by one testing revolution as described above; however, the spring means 29 must also be realized on the other side of the transverse slide 28, so that the transverse slide can correspondingly be displaced somewhat by the fixed feeler 26 counter to these spring means, and this fixed feeler can come into contact with the other tooth flank of the associated tooth gap, that is, the other tooth flank as compared with what is shown in FIG. 3.

It must again be noted that for all the known testing operations the sequence of the movement of the feelers or the detent means must be adjusted in accordance with the rotational speed of the gear 3 or 20 in such a manner that the individual measuring operations will take place in sequence from one tooth gap to another.

A third known testing apparatus should also be mentioned in which the gear is coaxially connected with a rotational drive means to be described in further detail below, which performs the positioning of the gear for the individual testing operations taking place by means of the feeler 13 according to FIG. 2, or the detent means 21, 22 according to FIG. 3. In that case, then only one pivotable feeler is disposed on the main slide, this feeler coming into contact with a left or right tooth flank for each measuring operation. Here again, this one tooth flank is scanned for spacing deviations over the course of one testing revolution, and then the feeler is shifted over to the other tooth flank and the other tooth flank is scanned in a second testing revolution taking place in the opposite direction.

With respect to the above-described, known testing apparatuses, it must be mentioned that they permit a relative circular or circumferential spacing testing on the one hand and an absolute circular spacing testing on the other. In the forms of embodiment described in connection with FIGS. 2 and 3, a relative circular spacing testing takes place, because as a result of the contact of the fixed feeler 13 or 26 on the one hand and the detent means 21, 22 on the other, flank errors enter into the positioning of the gear 3 or 20, so that what can be ascertained at any given time is only the spacing deviation resulting between the feelers 12, 13 on the one hand and 26, 27 on the other. However, if the spacing testing apparatus likewise described is made the point of departure where the positioning of the gear by means of a rotational drive means is possible in an ideal form from one tooth gap to another, then in that case an absolute circular spacing testing takes place, because the measuring feeler at a given time ascertains the deviation in comparison with the ideal (error-free) tooth flank position.

Figure 4:
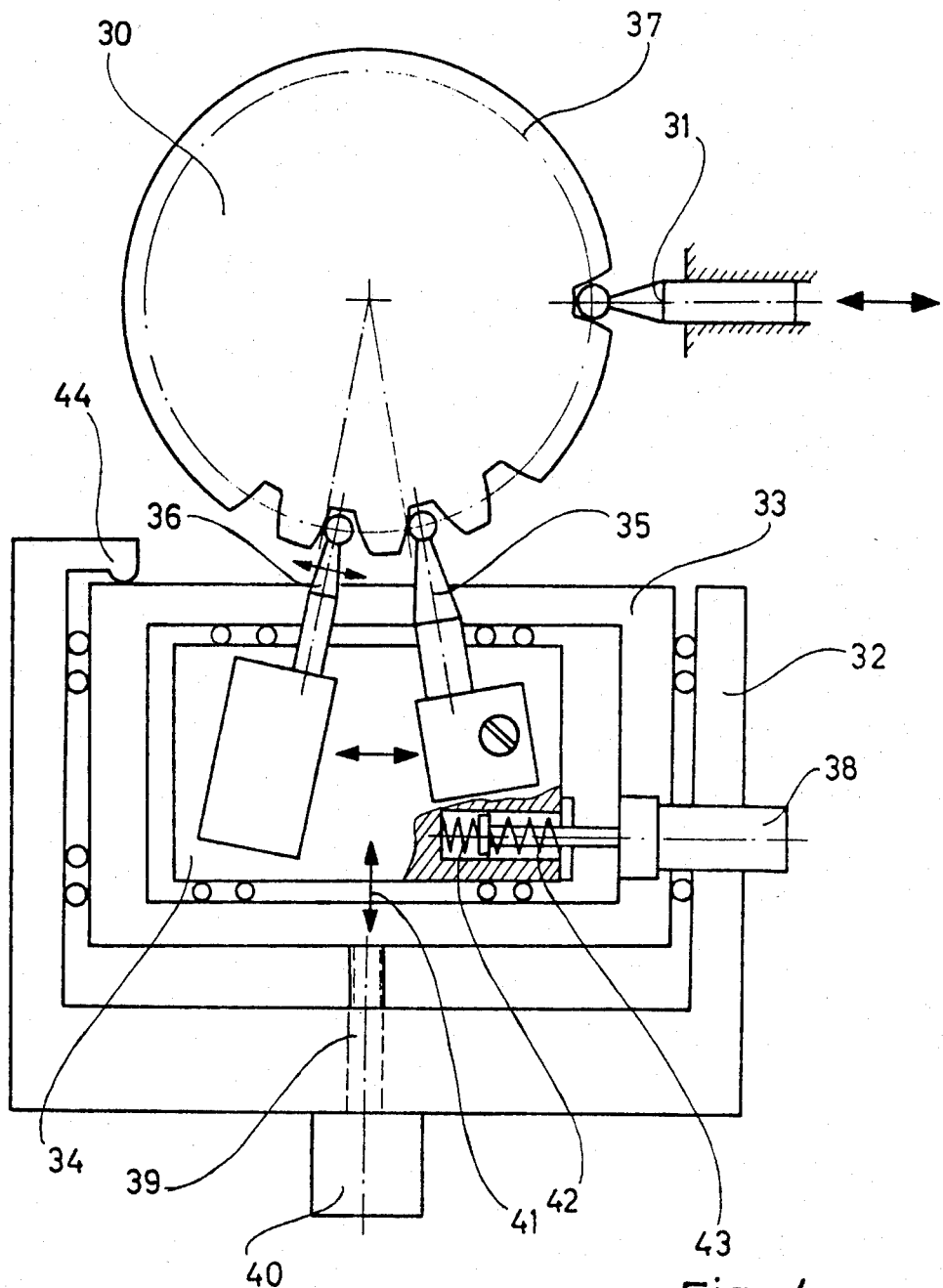
FIG. 4 is a first embodiment in accordance with the invention of the testing apparatus, shown in simplified form and in a plan view.

FIG. 4, based on the example shown in FIG. 3, shows a first embodiment of the invention for ascertaining circular or circumferential spacing testing such that both tooth flanks are scanned simultaneously in one revolution of the gear wheel.

To this end, as in FIG. 3, the gear wheel 30 is again positionable by detent means 31 of the described type for the individual measuring operations, and on the machine frame 32 a main slide 33 is displaceable in the direction toward the gear wheel 30. The main slide 33 carries a transverse slide 34 on which one fixed feeler 35 is positioned and one pivotable measuring feeler 36 preferably cooperating with an inductive transducer. The feelers 35 and 36 are adjusted in the manner already described in connection with FIG. 3 to the same circle in the vicinity of the pitch circle 37 and in adjacent tooth gaps rests on identical (right or left) tooth flanks. The zero balance in a first measuring process is effected in the described manner.

However, in the embodiment of FIG. 4 the transverse slide 34 can be indexed back and forth between two positions by a swithing means, taking the form, for example, of a switching magnet 38; in these positions the feelers 35, 36 come into contact, in the manner shown, first with the left tooth flanks and then, having been indexed toward the right, on the corresponding right tooth flanks of adjacent tooth edges. In addition to the zero balance and the correct positioning of the feeler 35, 36 in the manner already described above, the spacing testing takes place with a positioning of the gear wheel 30 by means of the detent means 31, with respect to both the left and the right tooth flanks, before the feelers 35, 36 (with the aid of the main slide 33) and the detent are retracted from the teeth. Subsequently the gear 30 rotates further under the influence of the drive means transmitted from the slip coupling, until the gear is arrested once again at the next tooth gap by means of the detent means 31, and the testing operation begins once again with respect to the left and right tooth flanks.

FIG. 4 also shows an exemplary fashion how the main slide 33 is displaceable back and forth by means of a rotational drive 39, 40 in the direction of the double arrow 41. Spring means 42, 43 can also be seen on the switching magnet 38 in its operational connection with the transverse slide 34; the spring means 42, 43 assure that the fixed feeler 35 will be in contact at the appropriate time with the flank to be tested.

In terms of the example shown in FIG. 4, it will be understood that the ascertained spacing deviations with respect to the right and left tooth flanks are processed and recorded separately from one another. This also applies to the following embodiments which will be discussed below.

Finally, it should also be noted that a stop 44 is shown against which the main slide 33 comes into contact in its advanced position toward the gear 30. The stop 44 is shown as fixed, but it may be embodied as adjustable as well. As for the rearward stop position of the main sled 33, this can most simply be represented by the mode of operation of the rotational drive 39, 40, but is also possible by means of a rear stop corresponding to the stop 44.

Figure 5:
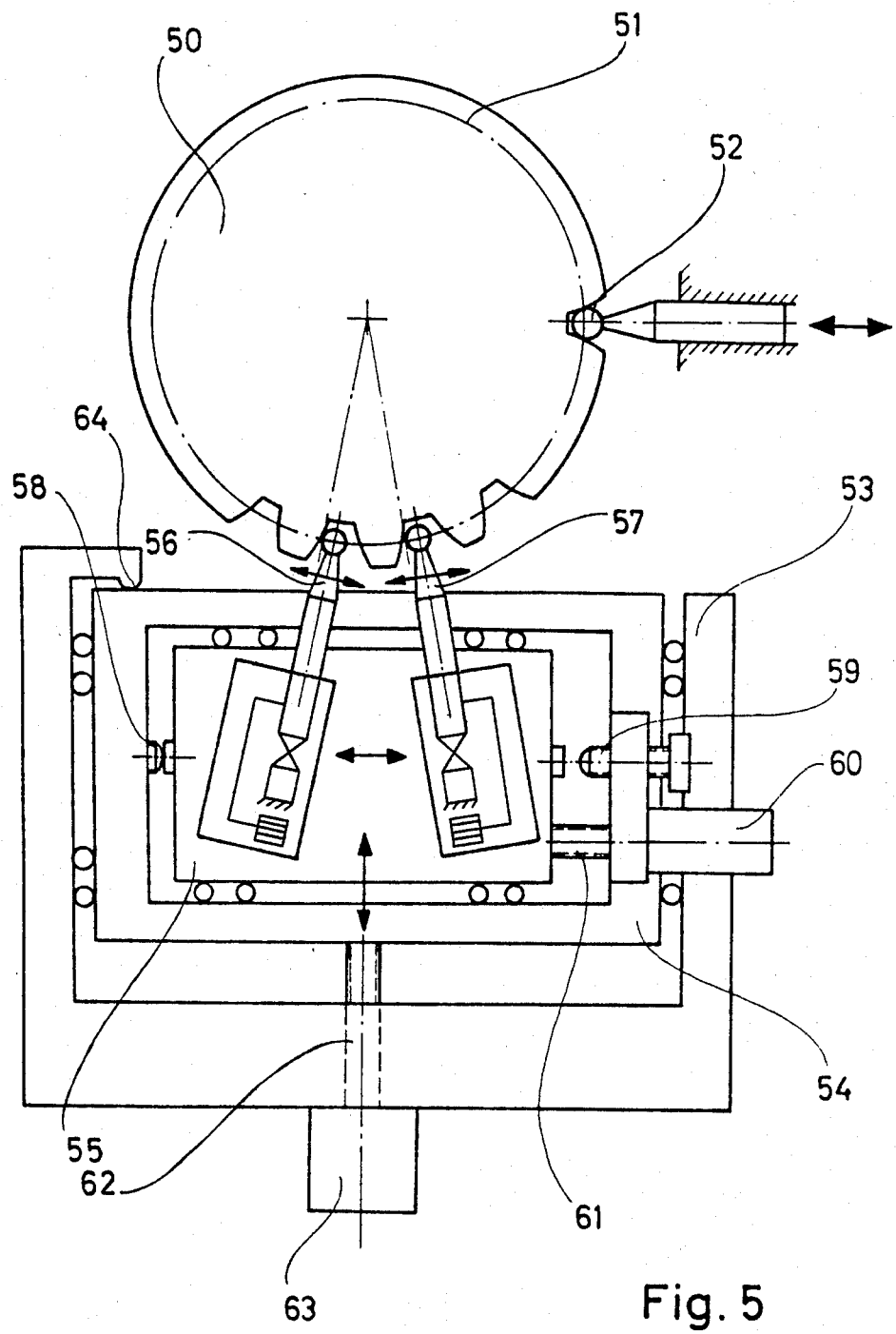
FIG. 5 is a modification of the testing apparatus shown in FIG. 4.

FIG. 5 shows a variant of the testing apparatus according to FIG. 4 where a gear 50 having a pitch circle 51 is arrested by means of a detent device 52 in the manner described above from one tooth gap to another counter to the action of the rotational drive of the gear and counter to the action of the slip coupling disposed between the rotational drive of the gear and the gear itself.

The machine frame 53 again has a main slide 54 displaceable substantially radially with respect to the gear wheel, on which a transverse slide 55 is displaceable substantially at a tangent to the gear 50. The transverse sled 55 carries two measuring feelers 56 and 57 which both cooperate in a manner, not shown, with an inductive transducer.

The displaceability of the transverse slide 55 is assured between stops 58 and 59, the stop 59 being adjustable to a dimension which permits the transverse slide 55 to have a displaceability greater than the tooth gap dimension of the gear 50 to be tested. The transverse displaceability of the transverse slide 55 can be effected via a servomotor 60 secured to the main slide 54, the servomotor 60 engaging the transverse slide 55 via an adjusting spindle 61. The radial displaceability of the main slide 54 is effected in the manner already described via a spindle drive 62, 63.

The measuring feelers 56, 57, for the stop position of the transverse slide 55, are adjusted to the left tooth flanks of two adjacent tooth gaps of the gear 50; again, the adjustment is effected to a common circle in the vicinity of the pitch circle 51, and the zero balance of the two measuring feelers is accomplished at that position. In a first testing position of this kind, the transverse slide 55 is then moved with the aid of the rotational drive means 60, 61 toward the stop 59, as a result of which the measuring feelers 56, 57 come into contact with the other flanks of the tooth gaps which they have entered. There again, the zero balance of the two measuring feelers is accomplished. The left and right tooth flanks of adjacent tooth gaps are thus ascertained by the measuring feelers 56 and 57 serving the purpose of spacing testing, and the testing of spacing deviations of adjacent tooth gaps of the gear 50 can be accomplished in one revolution of this gear by means of a sequentially performed insertion and retraction of the measuring feelers 56, 57 into and out of the teeth as well as shifting them over from one tooth flank to the other tooth flank of adjacent tooth gaps; this is done by indexing the transverse slide 55 back and forth from the stop position 58 to the stop position 59.

Here again, it will be understood that the transmission of a measurement value for the contact of the measuring feelers 56, 57 on the left tooth flanks is accomplished separately and evaluated separately from the measurement value for their contact with the right tooth flanks.

As in the above-described example, one stop position 64 is provided on the machine frame for the main slide 54, and what has been described in connection with FIG. 4 again applies. In the exemplary embodiments to be described below, this detail will no longer be discussed, because it is the same in each case.

Figure 6:
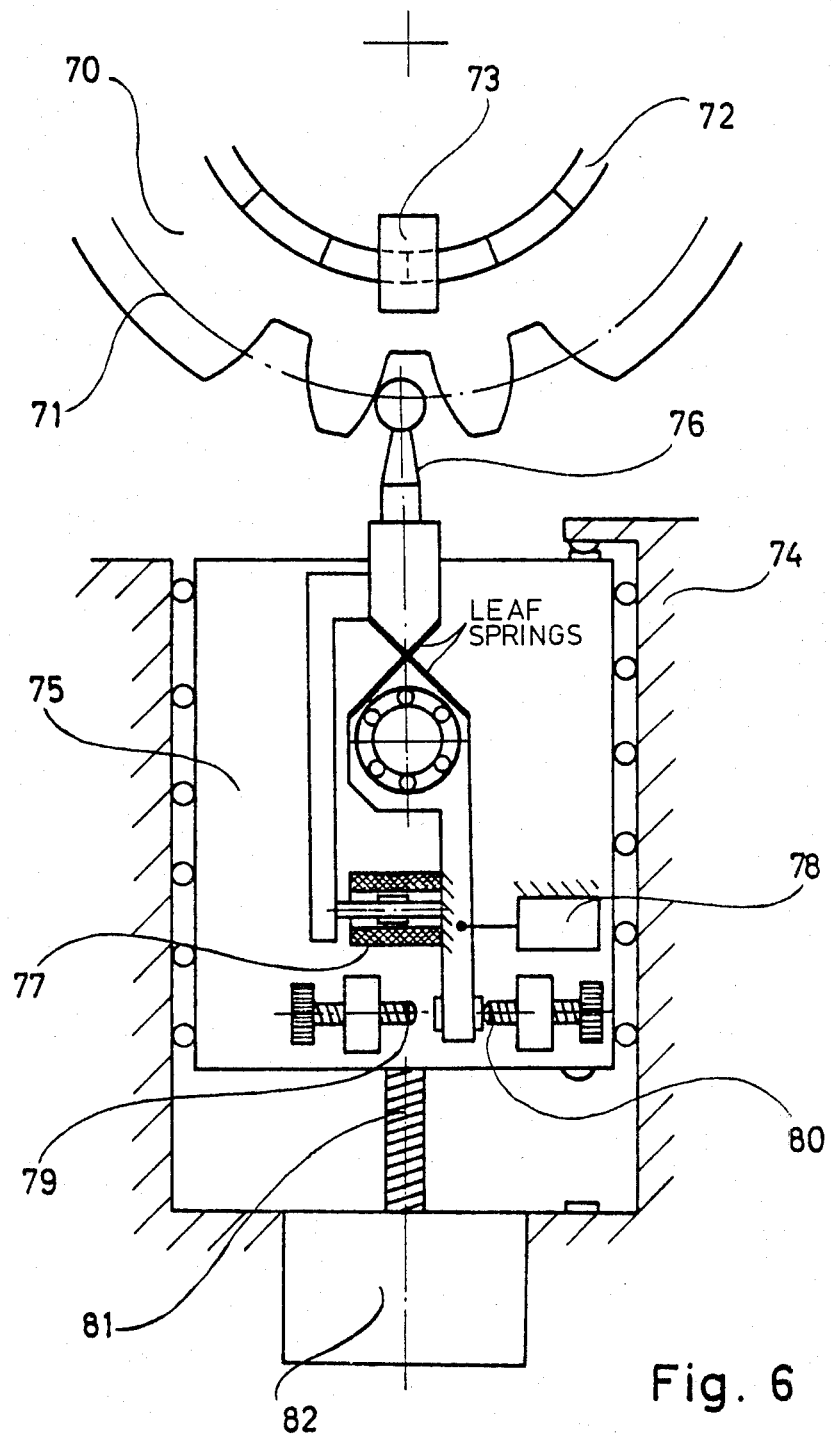
FIG. 6 is a simplified illustration of a plan view on a testing apparatus functioning with a rotational drive means and pivotable measuring feeler.

As shown in FIG. 6, a gear 70 having a pitch circle 71 is coaxially rotationally connected with an incremental rotational drive means, which substantially comprises an incremental measuring rod 72 and a scanning head 73 of conventional design as described in the manuals published by the company Johannes Heidenhain, GmbH, D-8225 Traunreut.

In the machine housing 74, a main slide 75 is again displaceable substantially radially to the gear 70 and carries a measuring feeler 76 which is pivotably supported and cooperates with an inductive transducer 77 in the manner now shown in detail. The measuring feeler is pivotable back and forth between two scanning positions by means of a switching device 78, taking the form by way of example of a switching magnet; these two positions are represented in simplified form by the stops 79 and 80 in which the distance therebetween is greater than the distance between tooth gaps in the gear to be tested, so that the measuring feeler 76 will be able without difficulty to come into contact with the left and right tooth flank in one tooth gap. The stops 79 and 80 in principle serve merely to prevent an "over-positioning" of the measuring feeler 76.

Finally, in the manner already described, FIG. 6 also shows the rotational drive means 81, 82 by which the main sled 75 and thus the feeler 76 are insertable into the teeth of the gear 70 and retractable therefrom. With the aid of the device shown in FIG. 6, the spacing testing of the gear 70 is accomplished such that the gear is positioned from tooth gap to tooth gap by the rotational transducer 72, 73, and then with the aid of the main slide 75 the measuring feeler 76 is inserted into the appropriate tooth gaps and first brought to rest on the left tooth flank as shown. After the pick-up of a measurement value, the switchover of of a measuring feeler 76 to the other tooth flank is accomplished with the aid of the switching means 78, and the measurement value pick-up associated therewith then takes place. It will again be understood that with respect to the left and right tooth flanks of one tooth gap, the measuring feeler 76 is first balanced to zero in a first measuring operation, and then in later measuring operations the deviation from these zero values can then be ascertained. Since in this case the positioning of the gear from tooth gap to tooth gap is effected by the rotational transducer 72, 73 in the ideal manner prespecified by a computer, the transmission of the measurement value by the measuring feeler 76 is also neutral in the sense that relative to the positioning by the rotational transducer 72, 73 absolute values for the flank deviations can be picked up. With respect to the spacing testing, it is understood that the respective measurement value pick-up for right and left flanks will be stored and then compared with the result of the testing operation at the next tooth gap, so as to ascertain spacing deviations.

Figure 7:
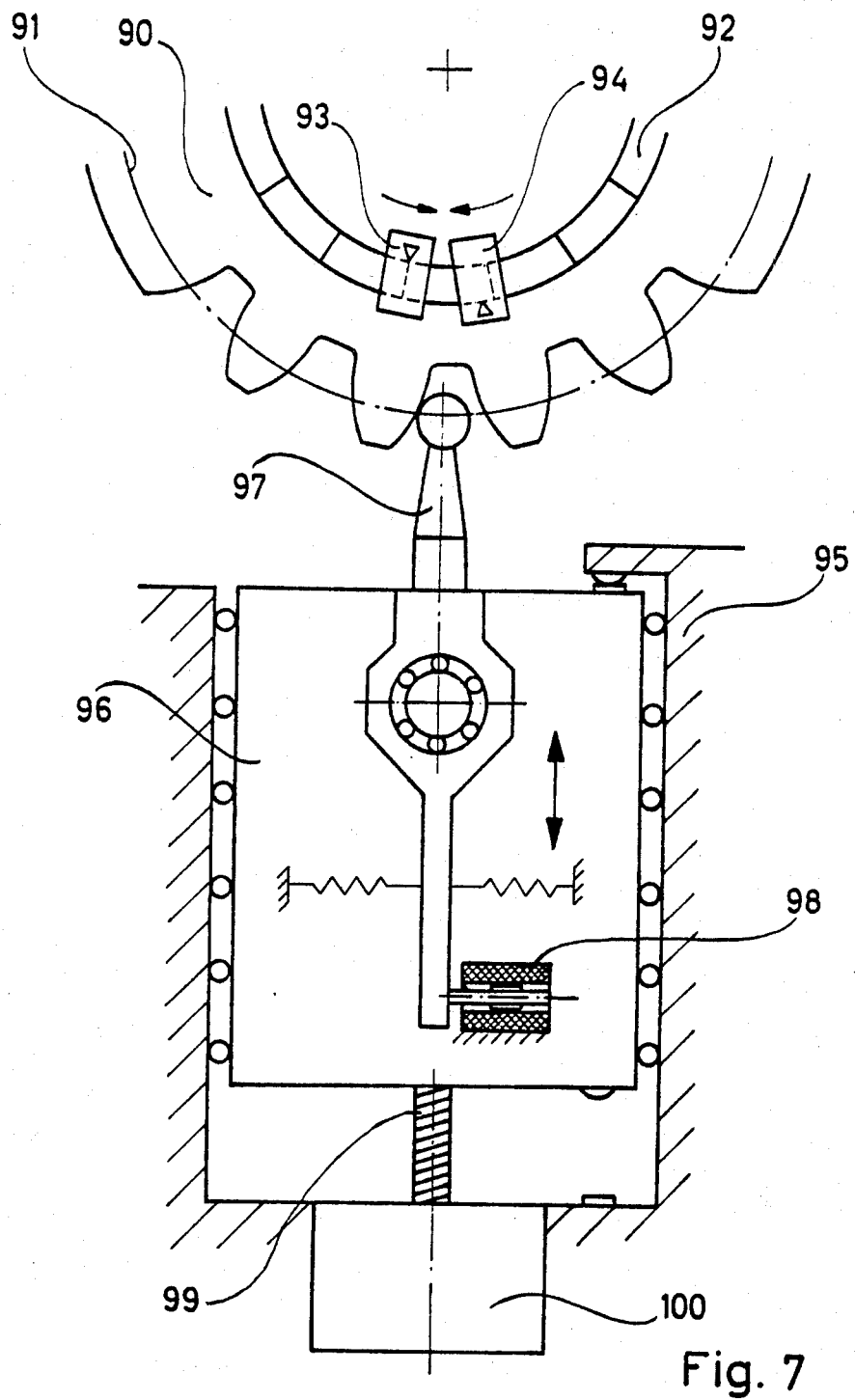
FIG. 7 is a simplified plan view of a testing apparatus having a rotational drive means with two scanning heads and one pivotable measuring feeler.

The testing apparatus according to FIG. 7 differs from the testing apparatus described above in that the gear 90 having a pitch circle 91 is rotationally connected with a coaxially disposed rotational transducer, which has an incremental measuring rod 92 and tooth scanning heads 93, 94, which with respect to one tooth gap are respectively directed toward one right tooth flank and one left tooth flank.

In the manner already described, is a machine housing 95 having a main slide 96 which is radially displaceable therein toward the gear wheel 90, and feeler 97 is pivotably supported on the main slide 96 and cooperates with an inductive transducer 98. The displaceability of the slide 96 is again provided by means of a spindle drive 99, 100. In the structural design according to this example, the positioning of the gear 90 is effected in that first, for example with the aid of the scanning head 93, the left tooth flank of the approached tooth gap scanned in the manner shown by the measuring feeler 97 is scanned and the deviation is ascertained via the inductive transducer 98 with respect to an original zero balance. Then, with the aid of the scanning head 94, a shift in position of the gear 90 is accomplished in such a manner that the measuring feeler 97 comes into contact with the right tooth flank of the approached tooth gap, so that the deviation there as compared with an original zero balance can be ascertained with the aid of the inductive transducer 98. Once both these measurement steps have been completed and stored or expressed in the measurement apparatus for comparison with the measurement values of the next tooth gap, then the retraction of the measurement feeler from the teeth is effected by means of the automatic control of the measuring apparatus with the aid of the main slide 96, and the retarded reinsertion into the teeth for the next tooth gap is effected in accordance with the angular values prespecified by means of at least one of the scanning heads 93, 94 of the incremental rotational transducer with respect to the further rotation of the gear 90.

Figure 8:
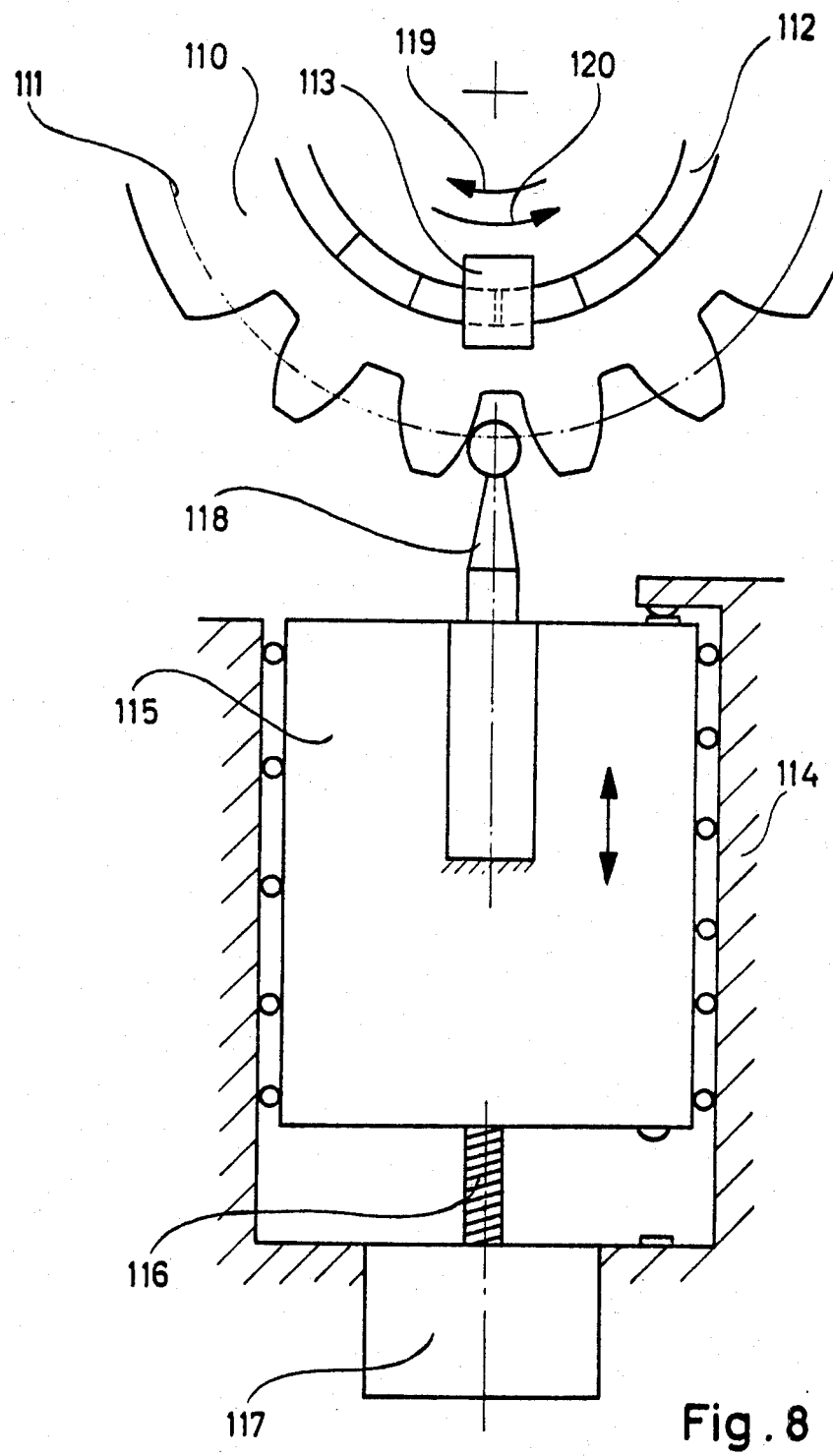
FIG. 8 is a simplified plan view of a testing apparatus having a rotational drive means as the measurement value transducer and a fixed feeler for positioning the gear wheel.

FIG. 8 shows a testing apparatus which is a modification of those described above, in which a gear 110 having a pitch circle 111 is coaxially rotationally connected with a rotational transducer having an incremental measuring rod 112, 113. On the side of the testing apparatus is a machine frame 114 having a main sled 115 displaceable thereon radially toward the gear wheel 110. In the manner already described, the main slide 115 can be driven by a spindle drive 116, 117 in the direction toward and away from the gear 110.

A fixed feeler 118 is disposed on the main slide 115, again being adjusted in a first testing operation to a circle in the vicinity of the pitch circle 111 of the gear 110. The gear 110 is also drivable in the opposite direction, as indicated by the arrows 119, 120.

Here the feeler 118 is inserted into a given tooth gap and contact is made by the feeler with the left tooth gap, for example. In this position, a measurement value for this flank is picked up by means of the scanning head 113. The other flank of the tooth gap is brought into contact with the feeler 118 by means of a reversal of the rotational direction of the gear, and the measurement value there is picked up by means of the scanning head 113 and furnished to the measurement apparatus.

These processes are repeated from one tooth gap to the next, and the values for the left and right tooth flanks are emitted separately from one another by means of the scanning head 113 for the purpose of further processing. In each case a difference or sum can be performed with the values scanned for identical tooth flanks in the previous tooth gap, so as to ascertain spacing deviations in this manner with the aid of a computer and to record them.

Figure 9:
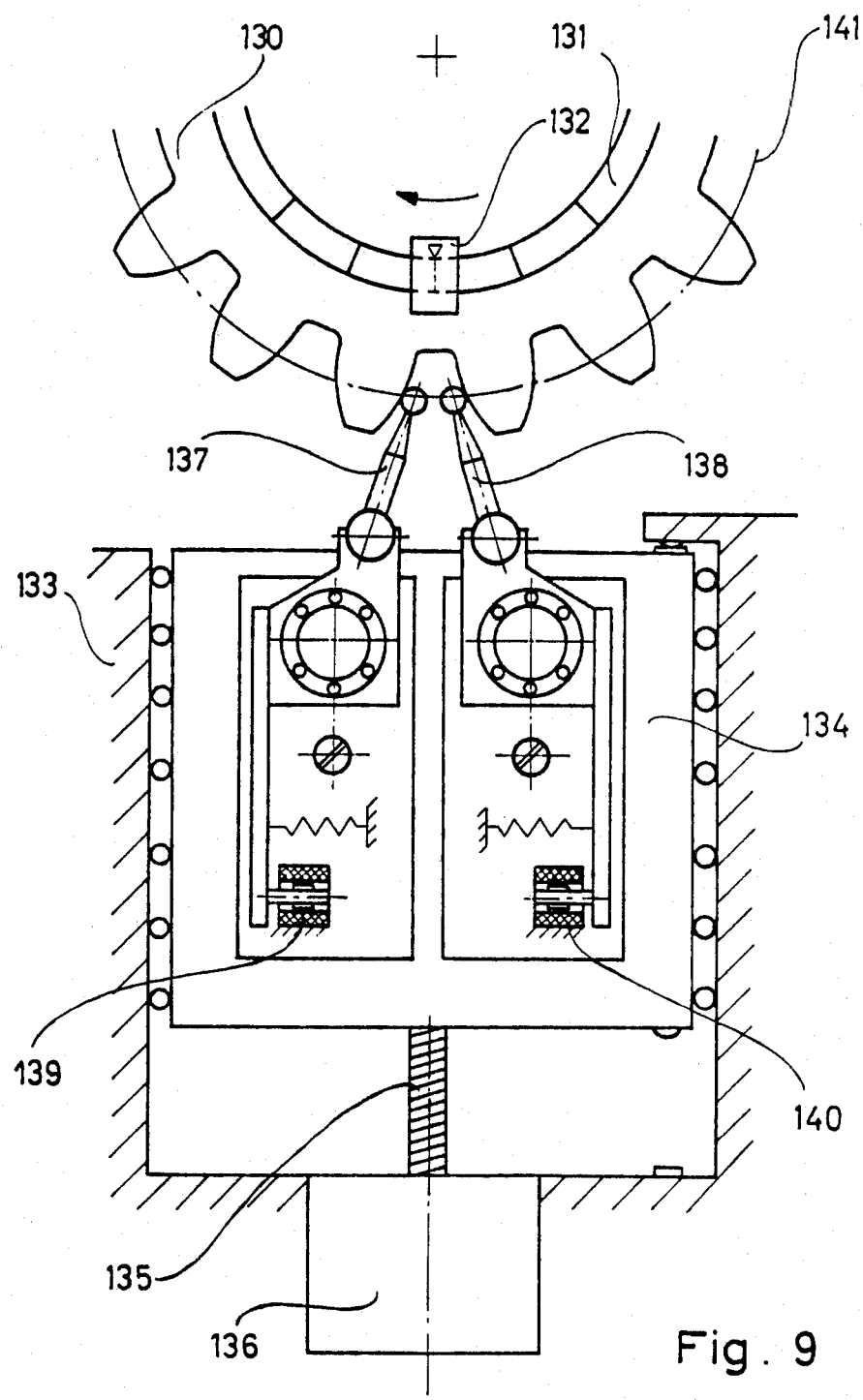
FIG. 9 is a simplified plan view of a testing apparatus having a rotational drive means for positioning purposes and two pivotable measuring feelers.

FIG. 9 shows one example in which a gear 130 is positioned from tooth gap to tooth gap with the aid of a rotational transducer 131, 132. On the side of the measuring apparatus, opposite the gear, is again a main slide 134 displaceable in the direction toward the gear 130 on a machine frame 133. The main slide 134 is displaceable by means of a spindle drive 135, 136.

Two measuring feelers 137, 138 are pivotably supported from the main slide 134 and each cooperates with one inductive transducer 139, 140. The measuring feelers 137, 138 are adjusted to a common tooth gap in such a manner that they are simultaneously in contact with the right and left flank of the tooth gap on the same circle in the vicinity of the pitch circle 141 of the gear.

In this version of the testing apparatus, the test object is arrested or positioned to the ideal dimension from one tooth gap to another by the rotational transducer 131, 132; then the feelers 137, 138 are inserted into the tooth gap with the aid of the main slide 134 and are there able to ascertain the deviations of the left or right tooth flanks in comparison with an originally performed zero balance. However, it is possible in the same manner with this test apparatus to perform the "positioning" for continuously rotating test objects with the aid of the rotational transducer in that a signal for the measurement value pick-up and transmission is provided by means of the rotational transducer with the simultaneous control of the insertion and retraction of the measuring feelers 137, 138 for a given measuring position, so that in this case it is not necessary to arrest the gear but instead the testing operation can take a continuous course. The further computer processing of the measurement values thus obtained, in comparison with the corresponding measurement values of the subsequent tooth gaps, then again furnishes the spacing deviations of the gear.

Figure 10:
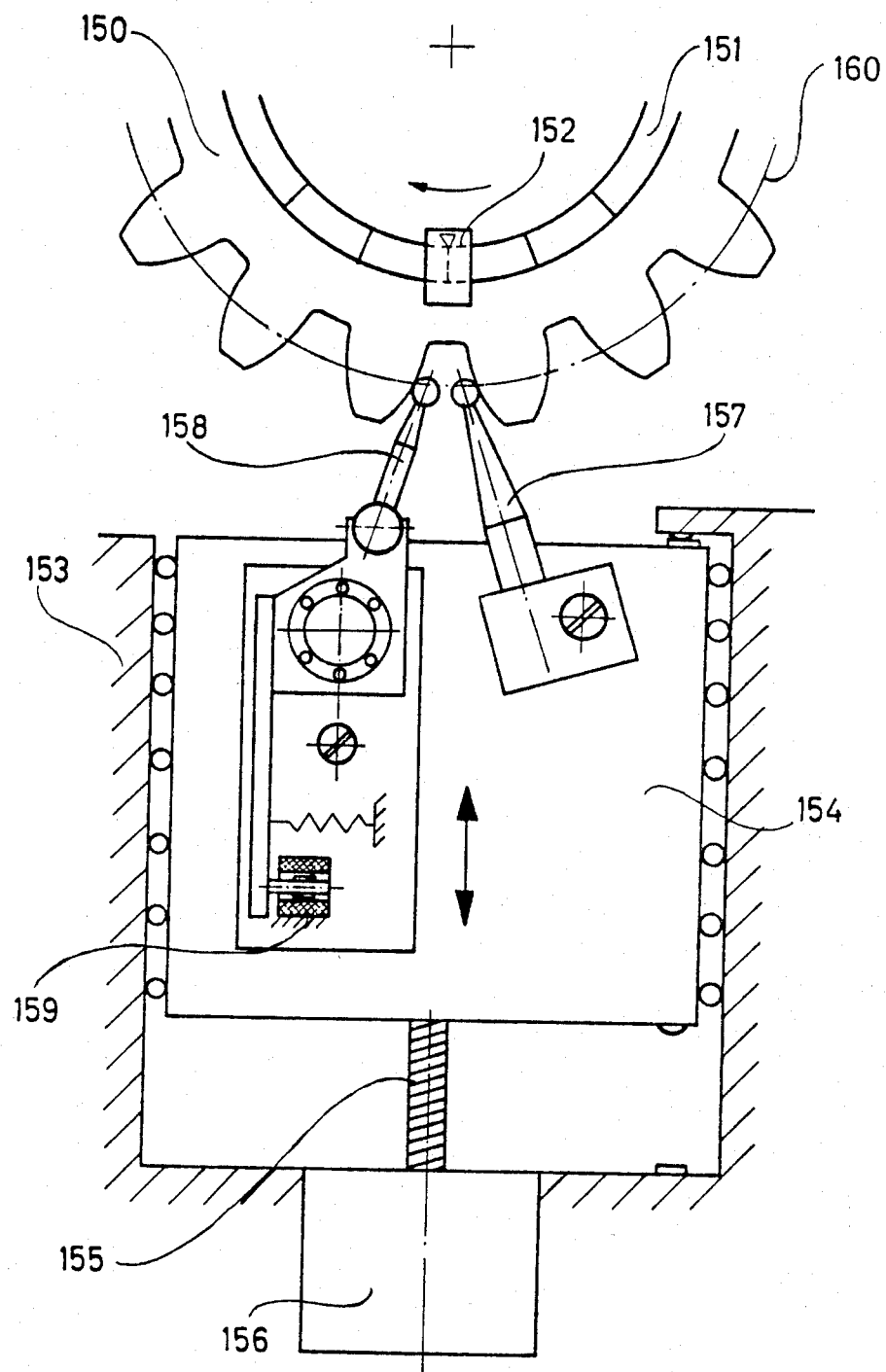
FIG. 10 is a simplified plan view of a testing apparatus having one fixed feeler for gear wheel positioning and one pivotable feeler and a rotational drive means for ascertaining measurement values.

Finally, the test apparatus according to FIG. 10 shows one form of embodiment of the invention in which a gear 150 is again connected with an incremental rotational transducer, which comprises an incremental measuring rod 151 and a scanning head 152.

Relative thereto, a main slide 154 is displaceable in the machine frame 153 substantially radially toward the gear wheel 150 by means of a spindle drive 155, 156.

Feelers 157 and 158 are pivotably supported on the main slide 154, the feeler 158 being connected with an inductive transducer 159. The feelers 157, 158 are adjusted in a suitable manner to the same circle in the vicinity of the pitch circle 160 of the gear 150 and positioned such that in the position of insertion into the teeth of the gear 150 they are in contact with the left and right tooth flank of the gear, respectively, in a common tooth gap.

The zero balance of the measurement value transducers is effected in a first measuring operation in which the gear is arrested by the fixed feeler 157, counter to the effect of the rotational drive acting on it and the slip coupling inserted therebetween, and then for the left flank, as shown, the pivotably measuring feeler 158 is balanced to zero, while at the same time the scanning head 152 of the rotational transducer is balanced to zero, which with respect to the positioning occurring for it on the part of the incremental measuring rod 151, corresponds with the positioning of the fixed feeler 157.

Subsequently, further testing operations are then effected so that the feelers 157, 158 are retracted incrementally from the teeth and then reinserted into the teeth in the next tooth gap, and the measurement value pickup for the left and right tooth flank of a given tooth gap is effected by means of the measuring feeler 158 on the one hand and the scanning head 152 on the other. The processing of the measurement value thus resulting in comparison with the original zero balance is accomplished in the manner already described by storage in the measurement apparatus and appropriate comparison with the values of the previously scanned tooth gaps; again, by means of forming a differential value in the manner already described earlier, an excess or deficiency in spacing can be ascertained.

Figure 11:
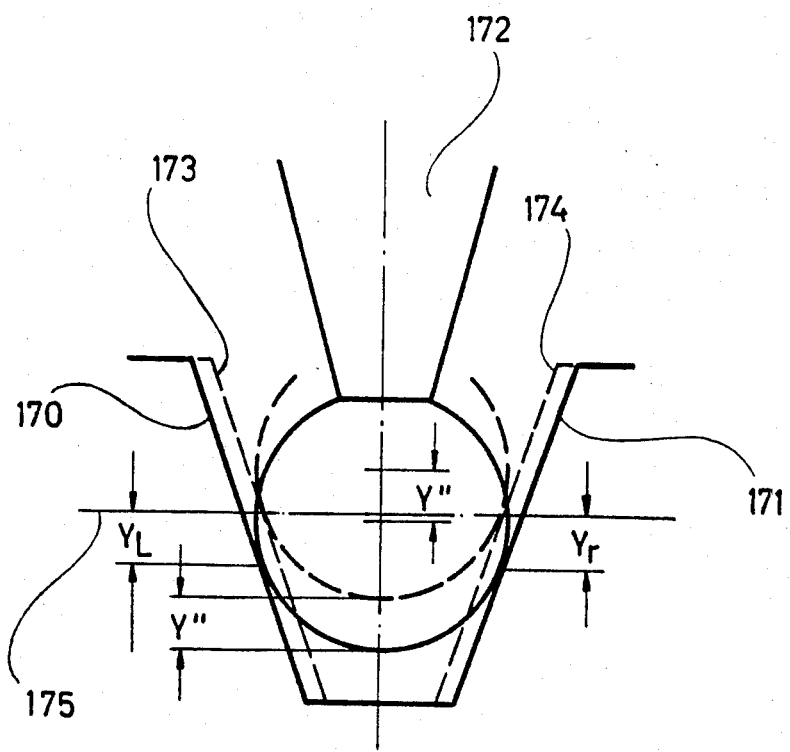
FIG. 11 is a schematic illustration of measurement of the deviations in tooth gaps and thus of deviations in gear concentricity according to the prior art.

The following discussion relates now to a method for measuring the deviations in gear concentricity, tooth thickness and tooth gap, wherewith using the apparatuses as already described, the usage of an independent testing apparatus becomes superfluous. The known method for ascertaining these three measurement values is shown in FIG. 11 in which a tooth gap having a left tooth flank 170 and a right tooth flank 171 has inserted into it a ball-shaped measuring feeler 172. In the present case, the tooth gap is too wide in comparison with the desired tooth gap size, which is represented by the flanks 173 and 174 drawn in dashed lines. The ball of the measuring feeler 172 is furthermore dimensioned such that in the case of an error-free tooth gap it would come to contact the tooth flank precisely at the level of the pitched circle 175. However, since the tooth gap is too wide, the ball of the measuring feeler 172 moves more deeply into the teeth, in fact by the amount $y''$ which is ascertained and recorded in this manner as a measurement value for the tooth gap deviation. Once the gear has made a complete rotation in this manner and each gap has thus been tested, the difference between the smallest and largest values of the curve recorded as a result of the testing process produces the deviation in gear concentricity.

As also seen from FIG. 11, the value $y''$ is composed of components $y_l$ and $y_r$; however, only the half of each of these partial values should be taken into consideration because if it is imagined that the error shown by way of example on the left flank 170 did not exist, then $y_l$ would equal zero, and only the amount $y_r$ would appear. However, the ball of the measuring feeler 172 would not penetrate by this amount into the teeth as compared with an error-free tooth gap, but instead would penetrate only to half the amount $y_r$.

Furthermore, the definition is such that in the case of an excessively large tooth gap the amounts $y_r$ and $y_l$ are considered to be positive values, while in an excessively small gap these amounts are made negative.

What has been described above applies in like manner to the measurement of tooth thickness, for which a measuring feeler having a forked shape can be imagined to be placed against a tooth in such a manner that in the case of an error-free tooth it touches the flanks thereof on the pitched circle. Here again, the error ascertainment is thus effected via the depth of insertion on the part of the fork-like feeler, and in contrast to what was described in connection with FIG. 11 only the algebraic signs ($+$ or $-$) are reversed. If the tooth is thicker than desired, that is, if it has an excessive dimension, then the fork-like feeler penetrates less deeply into the teeth, producing positive values for $y''$ and $y_l$ and $y_r$. If the tooth is too narrow, then these values become negative.

Figure 12:
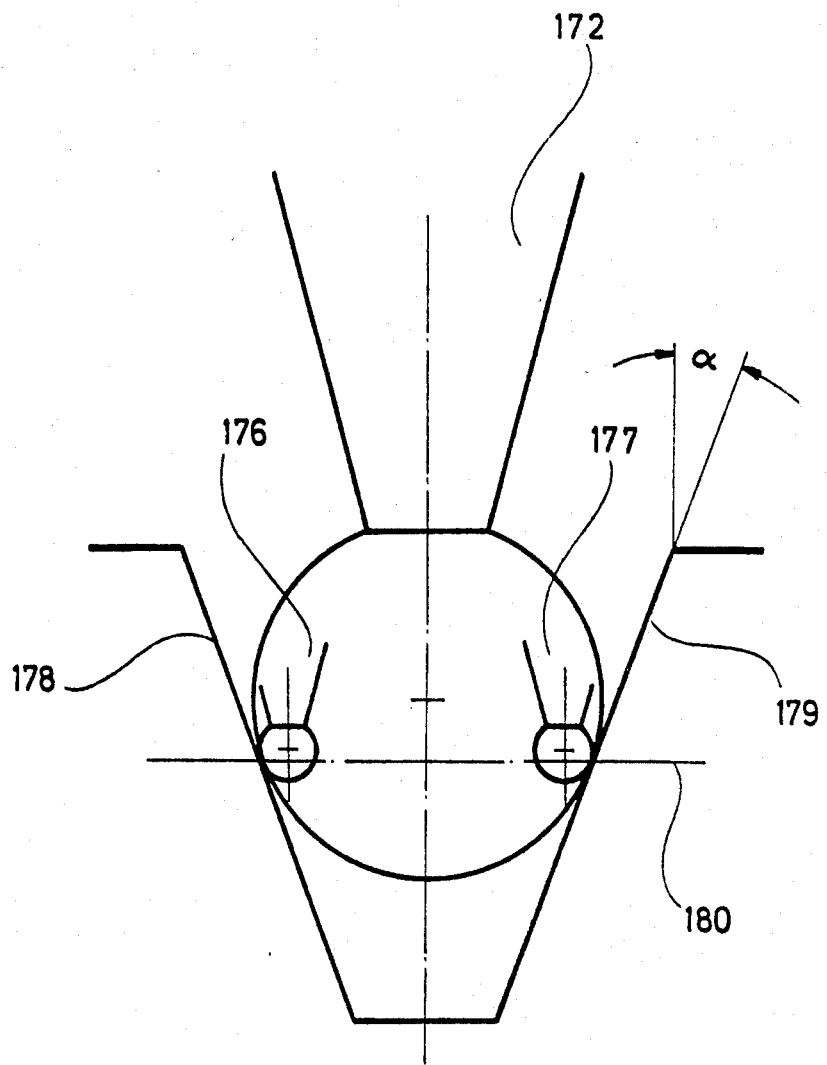
FIG. 12, schematically, shows a comparison of the known ascertainment of deviations in gear concentricity and tooth gap with the method according to the invention for ascertaining these deviations.

FIG. 12 now shows how in accordance with the invention the ball-like measuring feeler 172 is replaced with two individual feelers 176 and 177, which are adjusted on the testing apparatus such that in the case of the error-free tooth flanks 178 and 179 shown in FIG. 12 they touch the tooth flanks precisely on the pitch circle 180.

Figure 13:
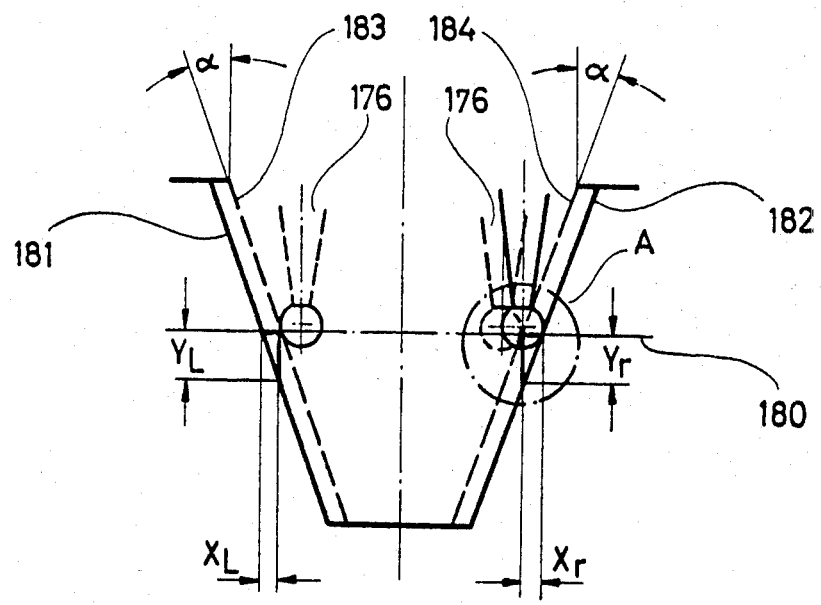
FIG. 13 is an explanation of the method according to the invention for ascertaining deviations in gear concentricity and tooth gaps.

With the feelers 176 and 177, the known manner of testing according to FIG. 11 will now be discussed such as is shown in FIG. 13. According to FIG. 13, as in FIG. 11, the tooth gap is overly large, as is represented by the solid flanks 181 and 182. The error-free flanks are indicated by dashed lines 183, 184. If these flanks are now scanned by two feelers 176, 177 which are adjusted to the pitch circle 180, then in comparison with their dashed representations the feelers undergo a deflection movement $x_r$ and $x_l$ in the direction of the pitch circle as compared with the error-free positioning. In other words, in this case the feelers do not penetrate more deeply into the tooth gap but instead have a contact point which is shifted in the circumferential direction by the amounts $x_r$ and $x_l$.

The values $y_r$ and $y_l$ can now be ascertained from these amounts $x_r$ and $x_l$, in that $y_r$ equals $x_r/\tan \alpha$ and $y_l$ equals $x_l/\tan \alpha$, where $\alpha$ is the angle of engagement.

Once the amounts $y_r$ and $y_l$ have been ascertained in this manner, then in accordance with what has been said above they must be each be divided in half, resulting in $y'_r$ equal to $y_r/2$ and $y'_l$ equal to $y_l/2$. The result then is $y''$ equals $y'_r$ plus $y'_l$.

In the example described above referring to FIG. 13, the amounts $y_r$ and $y_l$ are both positive, so that $y''$ also becomes positive. If it is assumed referring to FIG. 13 that the solid flank lines represented the error-free lines while the dashed lines represented an excessively narrow tooth gap, then the amounts $y_r$ and $y_l$ would be negative, so that $y''$ would also become negative. Finally, it may equally well be imagined that one flank might have an excessive dimension while the other flank is too small, resulting in positive and negative amounts $y'$ to be added together.

Figure 14:
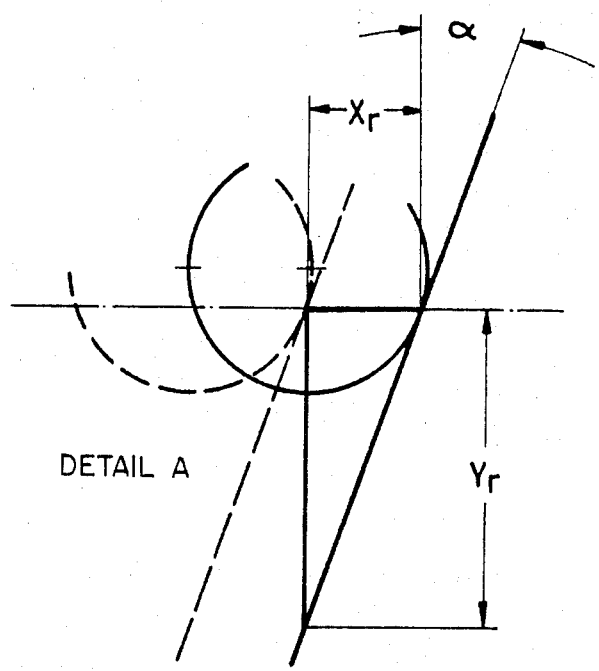
FIG. 14 is a detail of FIG. 13.

FIG. 14, as detail A from FIG. 13, once again shows more clearly how the amounts $x_l$ and $y_l$ are related via the engagement angle.

The relationships explained above in terms of testing of the tooth gaps, which furthermore produces the determination of gear concentricity deviation, apply in a corresponding manner to the testing of the tooth thickness but in that case the algebraic sign for the insertion depth is reversed.

In this manner it is possible with the testing apparatuses explained in FIGS. 4-10 to determine gear concentricity deviations, tooth thickness deviations, and gap deviations as well, and all that is necessary is for the values furnished by the corresponding measurement feelers or measurement value transducers to be further processed or prepared in the manner described earlier with the aid of a computer before the values are emitted.

For instance, if the testing apparatus of FIG. 4 is taken as an example, then the values furnished by the measuring feeler 36 at the two indexed positions of the transverse sled 34 for the purpose of testing spacing can simultaneously, that is, in parallel, be used for ascertaining a tooth gap deviation; the amounts $x_r$ and $x_l$ are thus picked up and further processed in the described manner. Furthermore, for testing tooth thickness deviation, the associated amounts $x_r$ and $x_l$ are picked up via the measuring feeler 36 and further processed separately in the described manner.

The result, by way of example with a measuring apparatus as shown in FIG. 4, is that the spacing testing as well as the ascertainment of deviations in gear concentricity, tooth thickness, and tooth gap can be accomplished simultaneously in one measurement revolution.

The same is true for the testing apparatus shown in FIG. 5, but in this case for the tooth gap deviation the two (right and left) measurement values of one of the two feelers 56 and 57 should be used—thus producing the gear concentricity deviation—while for the tooth thickness deviation with respect to one tooth the measurement value deviation of one of the feelers 56 or 57 from one measurement operation is compared with the contact of this measuring feeler at the same tooth during the next subsequent measuring operation. However, it is equally possible to compare the measurement value of the contact of one measurement feeler 56 on one tooth directly with the foregoing contact of the other measuring feeler 57 on the same tooth.

If the testing apparatus according to FIG. 6 is used, then the measurement values of the right and left tooth flanks effected by means of the rotational transducer 72, 73, which represent ideal spacing of the gear 70, can respectively be stored and then compared with the measurement values ascertained during the next measuring operation, the comparison being effected by forming a differential value. Again, the principle applies that an excessive dimension of the tooth gap is represented as a positive measurement result with respect to the testing of tooth gap and tooth spacing concentricity, while the same result in this case is processed as a negative measurement result in terms of the testing of tooth thickness.

What has been said above logically applies also to the embodiments of testing apparatus shown in FIGS. 7-10; the following discussion will relate by way of example to the form of embodiment shown in FIG. 9. two pivotably measuring feelers 137, 138 when the gear 130 is positioned from gap to gap with the aid of the rotational transducer 131, 132. In this measurement, which actually serves the purpose of testing spacing, the dimension of a tooth gap at a given time compared with an original zero balance will occur directly if the values furnished by the measuring feelers 137, 138 are compared separately and parallel with one another or subjected to differentiation. For the tooth thickness dimension, all that is required is storage of the measurement value produced by one of the measuring feelers, and the comparison with the measurement value produced by the other feeler during the next measuring process occurring at the other flank of the reference tooth. In summary, from the above explanation relating to the testing apparatus according to the invention, it may be said that the measurement values ascertained for testing the spacing deviation can simultaneously and parallel with the ascertainment of spacing deviation also be further processed for the purpose of determining deviations in the tooth gaps, in gear concentricity, and in tooth thickness in that the spacing deviations are ascertained simultaneously in terms of both the right and the left tooth flanks. All that is required is that these values be stored in a corresponding manner being supported by a computer and then related to the corresponding comparison values. In terms of apparatus, the means for the electric or electronic further processing in the described manner of the measurement values obtained are known per se, and will thus not be described further in the context of this specification.

The foregoing relates to preferred exemplary embodiments of the invention, it being understood that other embodiments and variants thereof are possible within the spirit and scope of the invention, the latter being defined by the appended claims.

What is claimed and desired to be secured by Letters patent of the United States is:

1. An automatic testing apparatus for testing the circumferential spacing of a gear rotationally driven in one rotational direction by a power source, comprising
    an indexing means for indexing said gear from one measuring position to another,
    a main slide displaceable on a frame,
    a feeler means disposed on said main slide in the vicinity of a pitch circle of said gear,
    means for measuring a deviation of a first tooth flank of at least one tooth gap and further means for measuring a second tooth flank during one insertion of said feeler means of the same tooth gap in the course of one gear revolution, including
    means for automatic insertion of said feeler means into said measuring position and for the retraction therefrom via said main slide continuing from one tooth gap to the next for successive measuring positions, a pickup means for providing a measurement value of respective tooth flanks relative to said at least one tooth gap before said gear is indexed to a successive measuring position, and a control means responsive to said pickup means for transmitting said measurement value from said pickup means for further processing.

2. A testing apparatus as defined by claim 1, wherein said indexing means comprises a detent device for periodic insertion into sequential tooth gaps of said gear, said main slide comprises a transverse slide displaceable thereon substantially at a tangent to said gear, said feeler means comprises a first measuring feeler fixedly connected on said transverse slide and a second measuring feeler pivotably supported thereon under the influence of a spring force, said second measuring feeler being connected with said pickup means, and said feelers being positioned on a same circle in the vicinity of said pitch circle of said gear, and a switching means (38, 42, 43) for displacing said transverse slide, whereby said feelers (35, 36) sequentially ascertain said spacing deviation in terms of both the right and the left flanks of adjacent tooth gaps of said gear.

3. A testing apparatus as defined by claim 2, wherein said switching means comprises a switching magnet (38) between said main (33) and said transverse slide, said transverse slide (34) moving under a spring force (42, 43).

4. A testing apparatus as defined by claim 1, wherein said main slide (54) comprises a transverse slide (55) displaceable thereon substantially at a tangent to said gear, said feeler means comprises a measuring feeler (56, 57) pivotably supported on said transverse slide under a spring force for contacting a tooth flank to be tested and being connected to said pickup means, and a second pivotably supported measuring feeler disposed on said transverse slide for contacting an equivalent tooth flank of an adjacent tooth gap, said measuring feelers positioned on the same circle in the vicinity of the pitch circle of said gear, and a drive mechanism (60, 61) disposed between said main slide and said transverse slide for indexing between stops (58, 59) said transverse slide in the vicinity of said tooth gap.

5. A testing apparatus as defined by claim 1, wherein said indexing means comprises an incremental rotational transducer disposed coaxially with said gear, said feeler means comprises a pivotably supported measuring feeler (76) for contacting a tooth flank to be tested under the influence of a spring force and being connected with said pickup means, and a switching means (78) for shifting said measuring feeler from one side of a tooth gap to be tested to the other side thereof.

6. A testing apparatus as defined by claim 1, wherein said indexing means comprises an incremental rotational transducer disposed coaxially with said gear and further having an incremental measuring rod (92) and a scanner head (93), said feeler means comprises a pivotably supported measuring feeler under a spring force for contacting a tooth flank to be tested and being connected with said pickup means, said rotational transducer having a second scanning head (94), the effective distance between said scanning heads corresponding to a specified dimension of a tooth gap in the vicinity of the pitch circle of said gear, whereby for one testing operation of said measuring feeler (97) said gear is rotatable from an effective measuring position of said one scanner head to an effective measuring position of said other scanner head.

7. A testing apparatus as defined by claim 1, wherein said feeler means comprises a fixed feeler disposed on said main slide for contacting a tooth flank to be tested in the vicinity of the pitch circle of said gear, and said indexing means comprises an incremental rotational transducer 112, 113 coaxially and rotationally connected with said gear and with said pickup means for rotating said gear in said one measuring position, said feeler (118) being inserted into a tooth gap and from the contact thereof on the one tooth flank thereof to the other tooth flank thereof in said one measuring position defining thereby two further measuring positions, whereby the angular values corresponding thereto are transmitted as measurement values by said rotational transducer.

8. A testing apparatus as defined by claim 1, wherein said indexing means comprises an incremental rotational transducer rotationally connected with said gear and coaxial therewith, said feeler means comprises two measuring feelers (137, 138) connected with said pickup means and pivotably supported on said main slide (134) for contacting the tooth flanks to be tested under the influence of a spring force, said measuring feelers being oriented to the same circle in the vicinity of the pitch circle of said gear and contacting adjacent right and left tooth flanks of a tooth gap in said one measuring position.

9. A testing apparatus as defined by claim 1, wherein said means for automatic insertion comprises an incremental rotational transducer rotationally connected with said gear and coaxial therewith, said feeler means comprises two measuring feelers (137, 138) connected with said pickup means and pivotably supported on said main slide (134) for contacting the tooth flanks to be tested under the influence of a spring force, said measuring feelers being oriented to the same circle in the vicinity of the pitch circle of said gear and contacting adjacent right and left tooth flanks of a tooth gap in said one measuring position.

10. A testing apparatus as defined by claim 1, wherein said indexing means comprises a feeler disposed in a fixed position on said main slide, said feeler means comprises a measuring feeler connected with said pickup means for contacting under a spring force the flank to be tested, said fixed position feeler and said measuring feeler (157, 158) being oriented respectively to the right and left tooth flank of a tooth gap, and an incremental rotational transducer (151) rotationally connected in a coaxial manner with said gear (150) and having a scanning head (152) connected to said pickup means, whereby the measurement value pickup for one tooth flank is effected by said measuring feeler (158) resting thereon and for the other tooth flank is effected by said scanning head (152) of said rotational transducer.

11. A method for testing the circumferentially spacing of a gear, in which said gear is automatically indexed from one measuring position to another for a measuring operation by a measuring means, in which the spacing deviation of adjacent tooth gaps as a given value in comparison with a zero balance value is measured, comprising the steps of, measuring the spacing deviation of both the right and the left tooth flanks of a given tooth gap for each measuring operation during the course of one gear revolution, and retracting said measuring means between individual measuring operations.

12. A method as defined by claim 11, characterized in that said spacing deviations are measured simultaneously.

13. A method as defined by claim 11, wherein said spacing deviations are measured one after another from one tooth gap side to the other tooth gap side.

14. A method for measuring the deviations in gear concentricity, tooth thickness, and tooth gaps in a gear, in which the tooth gaps are scanned by a measuring means and the deviation values are compared with a zero balance value effected in a first measuring operation, comprising the steps of, measuring the spacing deviation on each side of a tooth gap in the vicinity of a pitch circle of said gear, adding the deviation values resulting from the measurement values associated with said tooth gap in the circumferential direction, dividing the addition of said values by the tangent of the engagement angle of said measuring means with said tooth gap, dividing in half the result of the last mentioned step, and processing a measurement value deviation resulting from an excessive dimension of said tooth gap as a positive value in determining the tooth gap and gear concentricity deviation.

15. A method as defined by claim 11, wherein the measurement values resulting in the spacing testing are simultaneously used in parallel, with correspondingly different combination of values furnished by said measuring means, for ascertaining the deviation in gear concentricity, tooth thickness and tooth gap.

* * * * *